United States Patent
Aeschlimann et al.

(10) Patent No.: US 6,906,437 B2
(45) Date of Patent: Jun. 14, 2005

(54) CURRENT RECTIFIER ASSEMBLY FOR ROTATING ELECTRICAL MACHINES, IN PARTICULAR MOTOR VEHICLE ALTERNATORS

(75) Inventors: Michel Aeschlimann, Paris (FR); Sébastien Arrighi, Versailles (FR); Pierre Faverolle, Montgeron (FR); Thierry Hevia, Le Touquet (FR); Dirk Schulte, Bry sur Marne (FR)

(73) Assignee: Valeo Equipments Electriques Moteur, Creteil (FR)

( * ) Notice: Subject to any disclaimer, the term of this patent is extended or adjusted under 35 U.S.C. 154(b) by 0 days.

(21) Appl. No.: 10/363,995

(22) PCT Filed: Jul. 16, 2002

(86) PCT No.: PCT/FR02/02541

§ 371 (c)(1),
(2), (4) Date: Mar. 10, 2003

(87) PCT Pub. No.: WO03/009451

PCT Pub. Date: Jan. 30, 2003

(65) Prior Publication Data

US 2004/0012274 A1 Jan. 22, 2004

(30) Foreign Application Priority Data

Jul. 16, 2001 (FR) ............................................. 01 09480

(51) Int. Cl.$^7$ ............................................. H02K 12/00
(52) U.S. Cl. ....................... 310/68 D; 310/64; 363/154; 363/141; 363/145; 361/709
(58) Field of Search ................................ 310/68 D, 64; 363/154, 141, 145; 361/709

(56) References Cited

U.S. PATENT DOCUMENTS

| 5,646,838 | A | * | 7/1997 | Keidar | 363/145 |
| 5,991,184 | A | * | 11/1999 | Russell | 363/145 |
| 6,204,581 | B1 | * | 3/2001 | Lo | 310/68 D |
| 6,661,662 | B2 | * | 12/2003 | DeNardis | 361/707 |

FOREIGN PATENT DOCUMENTS

| FR | 1 457 157 | 1/1967 |
| FR | 2 796 776 | 1/2001 |
| GB | 1091922 | 11/1967 |
| WO | WO 00/01055 | 1/2000 |

* cited by examiner

*Primary Examiner*—Darren Schuberg
*Assistant Examiner*—Iraj A. Mohandesi
(74) *Attorney, Agent, or Firm*—Liniak, Berenato & White

(57) ABSTRACT

The invention concerns a current-rectifying arrangement for rotary electrical machines of the type comprising a support (50, 51, 51') for a plurality of positive diodes (66), a support for a plurality of negative diodes, forming part of the rear bearing of the machine, and a device for cooling by the creation of a forced axial flow of a cooling fluid through the rectifying arrangement, the support for the positive diodes carrying radial cooling fins (60) on its front face oriented towards the axis of the machine; the positive diode support device (66) being produced in the form of at least one moulded piece (50, 51, 51'), whose face oriented towards the aforementioned axis carries fine cooling fins (60).

The invention can be used in alternators for motor vehicles.

8 Claims, 6 Drawing Sheets

FIG. 3
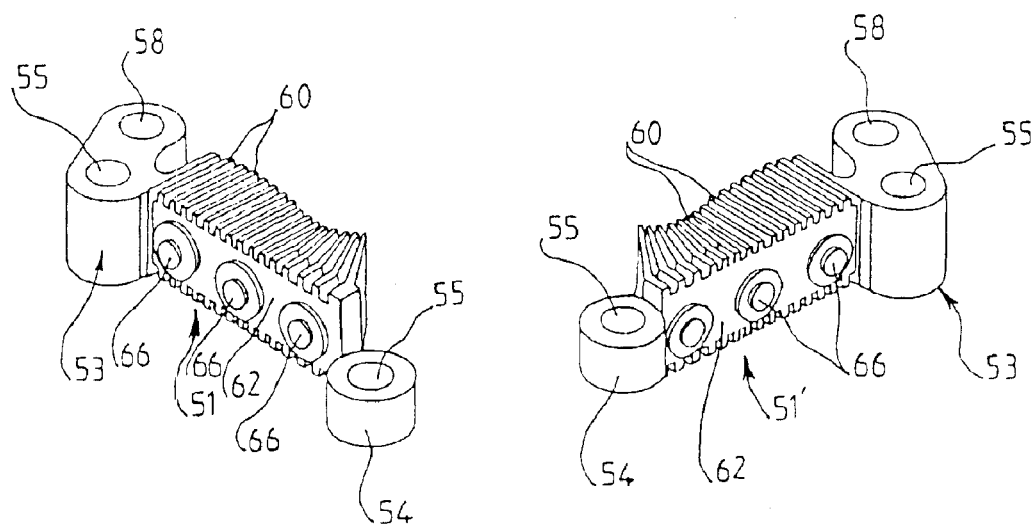
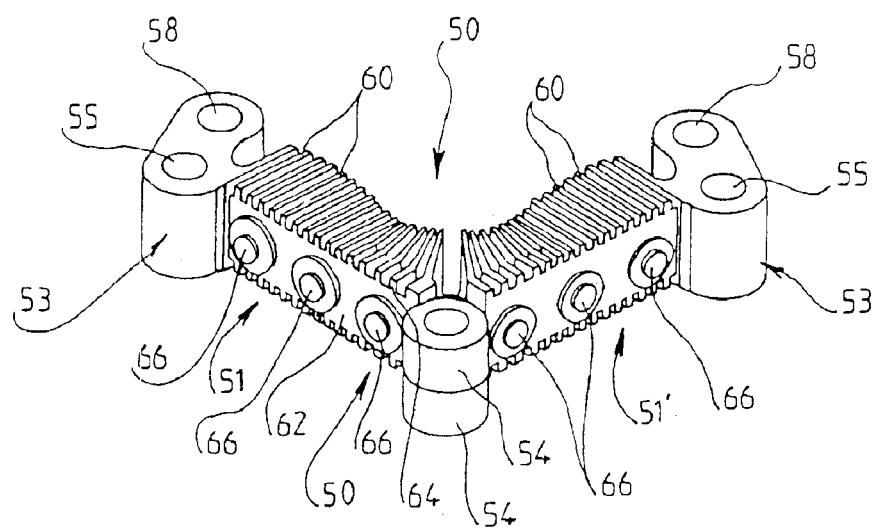
FIG. 4

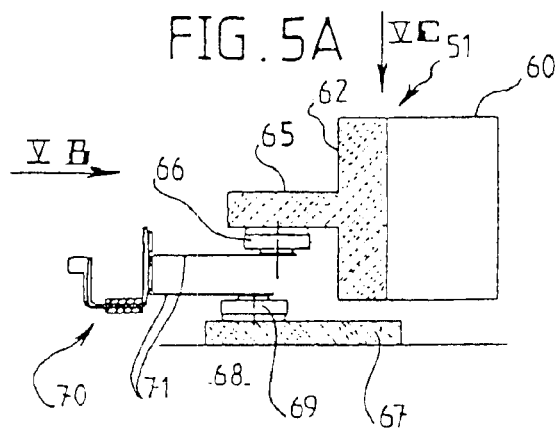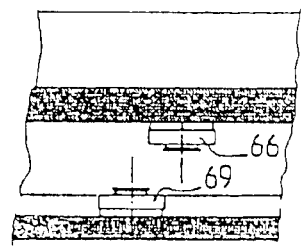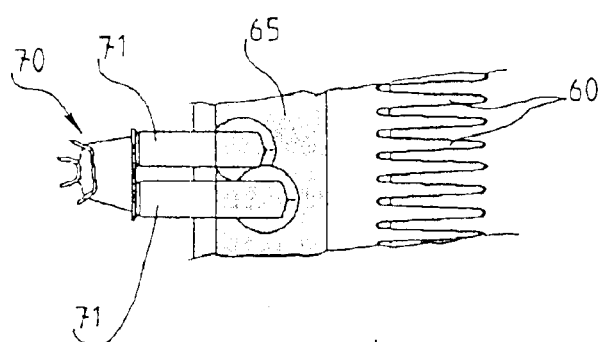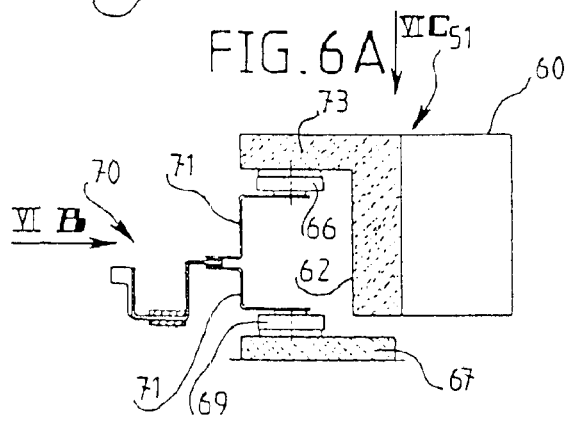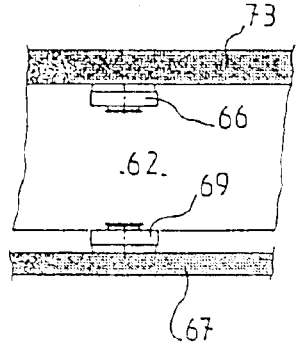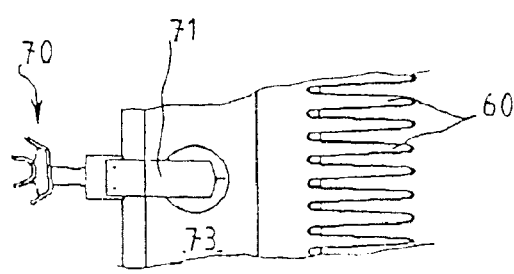

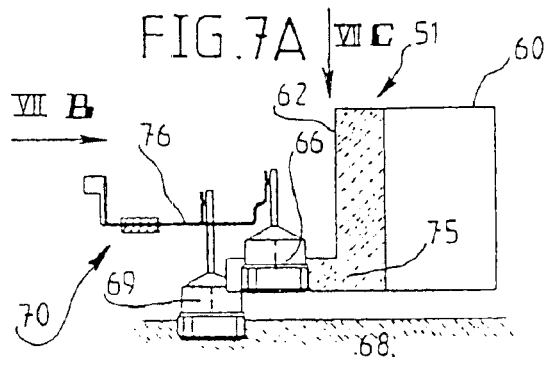
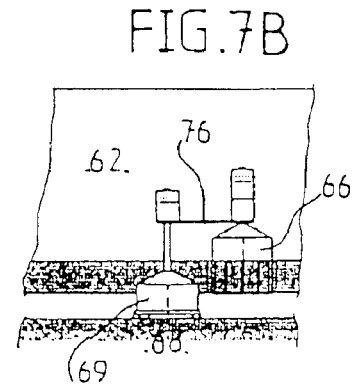
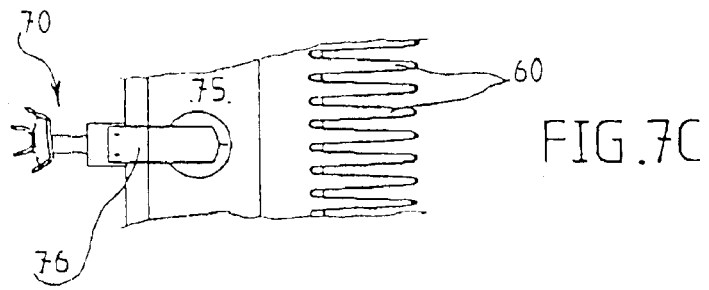
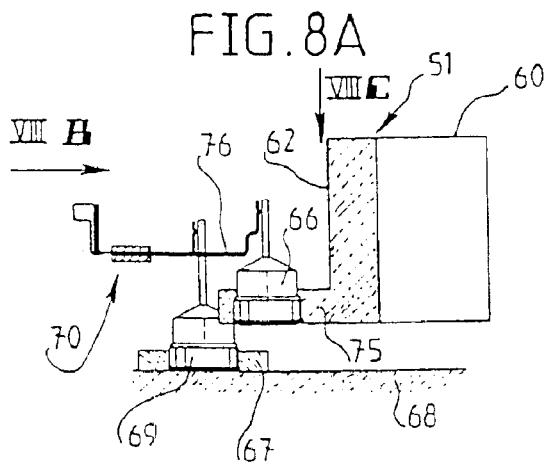
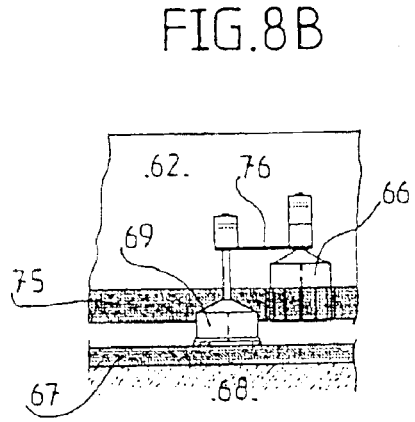
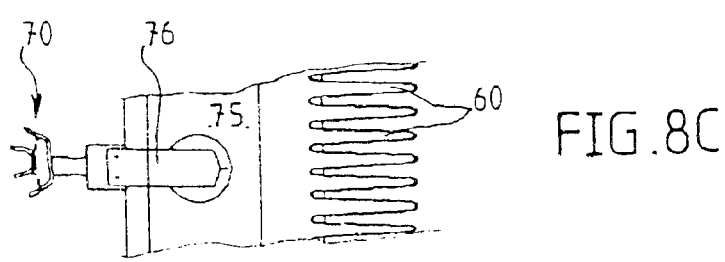

CURRENT RECTIFIER ASSEMBLY FOR ROTATING ELECTRICAL MACHINES, IN PARTICULAR MOTOR VEHICLE ALTERNATORS

FIELD OF THE INVENTION

The invention concerns a current-rectifying arrangement for rotary electrical machines, in particular alternators for motor vehicles, of the type comprising a support device for a plurality of positive diodes, having the general form of a plate of elongate shape, a support for a plurality of negative diodes in the form of a plate advantageously forming part of the rear bearing of the machine, a connector for the diodes and a device for cooling by creating a forced flow of a cooling fluid, such as air, in the axial direction of the machine, through the rectifying arrangement, the supports for the positive and negative diodes and the connector being superimposed in the direction of the axis of the machine and the positive diode support carrying cooling fins on its front face so as to form a radiator, which extend in the axial flow, in the radial direction of the machine. These supports are metallic, as is the rear bearing connected to earth. The rear bearing is perforated and forms, with the front bearing, also perforated, a casing supporting the stator of the machine. The front and rear bearings each carry centrally a ball bearing for the rotational mounting of the shaft supporting the rotor of the machine.

STATE OF THE ART

A rectifying arrangement of this type makes it possible to convert the induced alternating current of the machine stator into DC current for supplying the various consuming components in the vehicle is already known through French patent No. 2 687 861 of the applicant. FIGS. 1 and 2 illustrate this rectifying arrangement. FIG. 1 shows at 16 two support plates for the negative diodes bearing the reference 22, which are disposed in a V-shaped configuration. Each negative plate has the form of a circular sector with cants whose internal periphery 20 is recessed from the external periphery of openings 14 which are provided in the rear bearing 10 on the machine and are intended to let pass an axial cooling air flow generated by a fan mounted inside the machine close to the openings 14. As is known this fan is fixed to the rotor of the machine. The negative diodes 22 are disposed in mechanical and electrical contact with the top wall of their support plates. FIGS. 1 and 2 also show at 18 two supports for positive diodes 34, each formed by an extruded aluminium profiled section roughly situated facing the openings 14. These profiled sections, fulfilling the function of radiators, have no mechanical or electrical contact with the rear bearing 10 and their cooling is provided solely by convection, that is to say by the flow of air passing through the openings 14 and produced in a manner known per se by a fan rotationally fixed to the rotor of the alternator. Each radiator 18 is associated with a negative plate 16. It comprises a flat rear wall 32, perpendicular to the flat top face of the associated negative plate. On this face 32 which is situated at the external periphery of the openings 14 the positive diodes 34 are mounted. On its front face oriented towards the axis X of the machine there are provided cooling fins 40 which therefore extend radially in the cooling air flow and are subjected to cooling by convection. It can be seen that the two ends of each assembly formed by a negative plate 16 and a positive radiator 18 are each fixed by a tie rod or screw 38, 39 to the rear plate 10 and that the two radiators are connected by a connecting bar.

The rectifying arrangement which has just been described briefly has the major drawback that it is bulky and that the principle of the configuration of the supports and of the arrangement of the diodes does not allow an increase in the cooling capacity, which makes this known rectifying arrangement incompatible with alternators of higher power.

OBJECT OF THE INVENTION

The aim of the present invention is to mitigate this drawback of the known rectifying arrangement.

To achieve this aim, the rectifying arrangement according to the invention is characterised in that the positive diode support device is produced in the form of at least one moulded piece whose face oriented towards the aforementioned axis carries a large number of fine fins for increasing the heat exchange surface.

According to another characteristic of the invention, an arrangement according to the invention, comprising a positive diode support device which comprises two diode support parts, in the form of plates, aligned in the peripheral direction about the axis of the machine, is characterised in that the support device is fixed to the rear bearing by three fixings, including one in the joining area of the two parts.

According to yet another characteristic of the invention, an arrangement according to the invention in which the two positive diode support parts are each formed by a separate support plate, disposed in a V configuration and fixed at each of their ends to the rear bearing, is characterised in that the adjacent fixings of the two plates are joined.

According to yet another characteristic of the invention the arrangement is characterised in that the two support plates each have at their adjacent ends a fixing lug through which a passage hole for a fixing member passes and in that, in the assembled state, the two fixing lugs are superimposed so that their passage hole is axially aligned.

According to yet another characteristic of the invention the arrangement is characterised in that each fixing lug has a reduced height compared with the height of the support plate and advantageously has a height of half the height of the plate.

According to yet another characteristic of the invention the arrangement is characterised in that the two support parts for the positive diodes are produced in the form of a single moulded piece having a V configuration.

According to yet another characteristic of the invention, the arrangement is characterised in that the two positive diode support parts are produced in the form of a single moulded piece in the form of an arc of a circle.

According to yet another characteristic of the invention, the arrangement is characterised in that the orientation of the cooling fins towards the axis of the machine is chosen so that they extend substantially radially in the middle area of the device formed by the two support parts.

According to yet another characteristic of the invention, the arrangement is characterised in that the radial length of the fins varies over the length of the parts for the supports for the positive diodes, so that their front edge, in the middle area of the device formed by the two parts, is situated on an arc of a circle coaxial with the axis of the machine.

BRIEF DESCRIPTION OF THE DRAWINGS

The invention will be better understood and other aims, characteristics, details and advantages thereof will emerge more clearly in the following explanatory description made with reference to the accompanying schematic drawings given solely by way of example and illustrating several embodiments of the invention and in which:

FIG. 3 is a perspective view of the two positive radiators, with identical structures, before they are assembled for producing a positive radiator device of the rectifying arrangement according to the invention, according to a first embodiment;

FIG. 4 is a perspective view of the two positive radiators according to FIG. 1, after their assembly;

FIG. 5A is a partial view, in section in a radial plane of the rectifying device, of another embodiment of a positive radiator device;

FIG. 5B is a view, with cutaway, in the direction of the arrow VB in FIG. 5A;

FIG. 5C is a view in the direction of the arrow VC in FIG. 5A;

FIGS. 6A, 6B and 6C are views similar to FIGS. 5A, 5B, 5C of a variant embodiment of a positive radiator according to the invention;

FIGS. 7A, 7B and 7C are views similar to the views 5A, 5B, 5C of yet another variant of a positive radiator according to the invention;

FIGS. 8A, 8B, 8C are views similar to the views 7A, 7B, 7C of yet another variant embodiment of a positive radiator according to the invention;

DESCRIPTION OF EMBODIMENTS OF THE INVENTION

Figure 1:
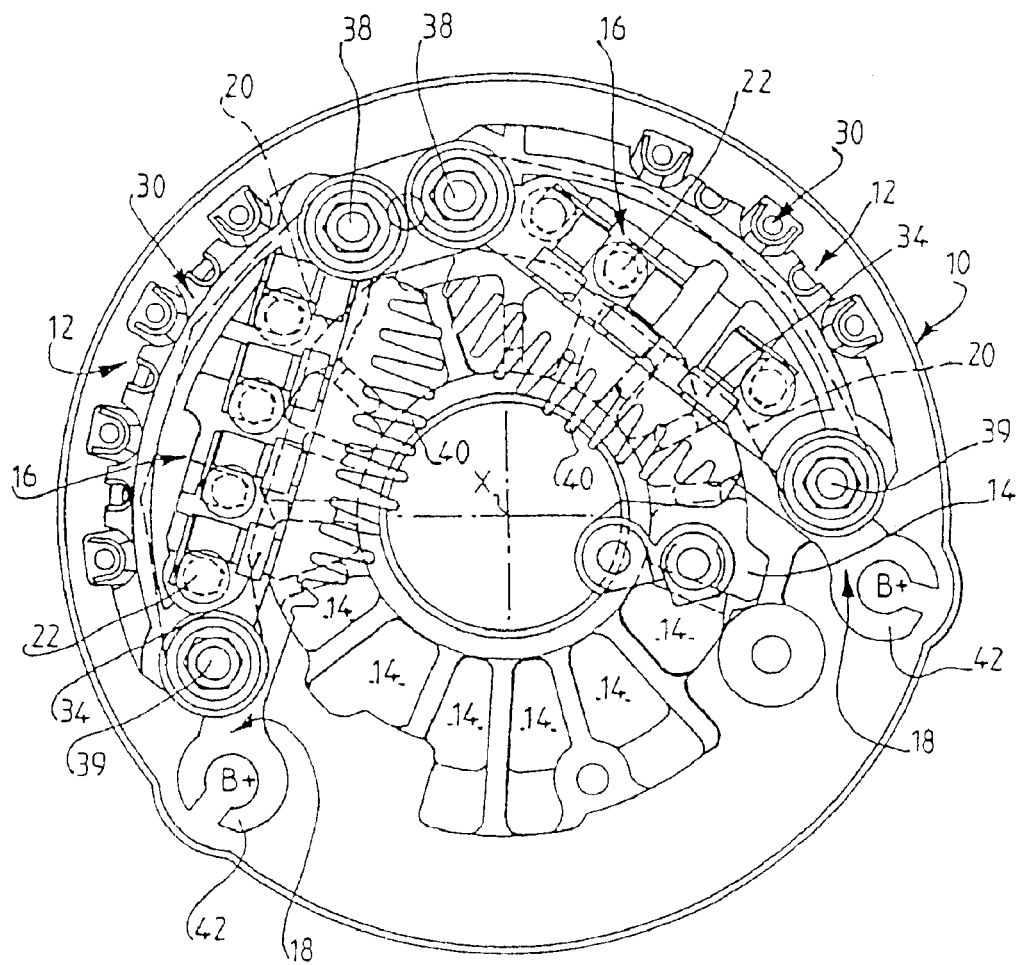
FIG. 1 is a plan view of a rectifying arrangement of the state of the art, mounted on an alternator rear bearing.
Figure 2:
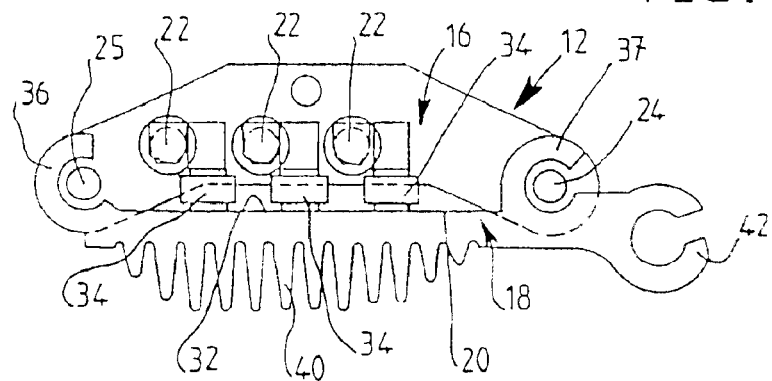
FIG. 2 shows part of the arrangement according to FIG. 1 without the rear bearing.

FIG. 4 illustrates a first embodiment of a positive radiator device according to the invention designated by the general reference 50, which is obtained by assembling two moulded positive radiators 51, 51' with identical structures, shown in FIG. 3. Each radiator 51, 51', with a straight elongate shape overall, has, at each of its ends, a lug 53, 54 for fixing to the rear bearing of the machine which has in it a hole 55 for the passage of a fixing member such as a screw or a tie rod with the interposing of an electrically insulating sleeve (not shown). The fixing lug 54 situated on the same side as the joining of the two radiators 51, 51' has a cylindrical shape with a height corresponding, in the example depicted, to half the height of the body of the radiator. The fixing lug 53 situated at the opposite end of the radiator also comprises a passage hole for a fixing member 55 a hole 57 for receiving the $B^+$ output terminal of the rectifier. Here the radiators are identical.

Given that the radiators are moulded pieces, they are configured so as to have on their front face a multitude of fine cooling fins 60 which extend in the radial direction of the machine so that the cooling fluid can flow between the fins. As can be seen in FIG. 4, which shows the assembly 50 obtained by connecting together the two radiators 51, 51', the radial length of the fins 60 is different over the length of the radiators so that the line formed by the front edges of the fins approximates to an arc of a circle in the joining area of the radiators 51, 51'. FIG. 4 also illustrates that the connection of the radiators is effected by superimposing their substantially cylindrical fixing lugs 54. Given that these lugs project from the flat rear front face 62 of the radiators, the separation between the adjacent external fins of the two radiators 51, 51' can be relatively small. In other words, practically the entire front face of the assembly formed by the two radiators is covered by fine cooling fins 60. It can be seen that the body of each radiator has, on its top and bottom faces seen in the axial direction of the machine, ribs 64 each in line with a fin 60.

The flat rear face 62 of each radiator carries three positive diodes 66 which are fixed to the radiator by brazing. The negative diodes, not shown in FIGS. 3 and 4, extend parallel to the axis of the machine. The positive and negative diodes are therefore located perpendicularly to one another. It is clear from the description which has just been given of the embodiment of the positive radiators according to FIGS. 3 and 4 that these radiators can comprise, because of the very fine character of the fins, a larger number of such fins for very effective cooling of the radiator.

Given that the fixing lugs of the two radiators are superimposed, the assembly shown in FIG. 4 has at the middle only one fixing location, which makes it possible to omit the bar connecting the two standard positive radiators shown for example in FIG. 1. The elimination of the connecting bar and thus of a fixing location procures a gain in useful space at the level of the joining of the two radiators. This makes it possible to bring the two central positive diodes closer together and affords a maximum separation of the negative diodes of the rear bearing. Another advantage lies in the fact that the two radiators can be identical.

Referring to FIGS. 5 to 10, other embodiments of the positive radiators are described which have in common the fact that the positive and negative radiators are fitted parallel to each other and mounted by fitting in or brazing in opposite orientations or oriented in parallel. The support for the negative diodes is here metallic and will be referred to as the negative dissipater.

FIGS. 5A to 5C illustrate an embodiment of the radiators which is characterised by a symmetrical configuration. The particularity of the positive radiators, still designated by the reference 51 in this embodiment, compared with the one depicted in FIGS. 3 and 4, lies in the fact that the flat rear face 62 carries, halfway up, a small wall 65 which projects halfway up the radiator perpendicular to this rear face 62. The bottom face of the small wall on which the positive diodes 66 are brazed faces the negative dissipater indicated at 67 and pressed for fixing on the rear bearing 68 of the machine. The negative diodes 69 are brazed on the top face of the dissipater. The positive 66 and negative 69 diodes are located in opposite orientations. The connector is designated by the reference 60 and is distinguished by the simplicity of the diode-connecting tongues 71. The figures show that the positive and negative diodes in each pair of diodes are offset in both the radial and circumferential direction.

FIGS. 6A to 6C illustrate a variant embodiment in which the rear face 62 of each radiator is provided with a small wall 73 projecting perpendicularly but which is disposed at the top of the radiator. The latter consequently has an asymmetric structure. The positive 66 and negative 69 diodes are brazed in opposite orientations on the opposite faces of the small wall 73 and negative dissipater 67. They are situated in the same vertical plane. In this variant the diodes are further away from each other.

FIGS. 7A to 7C present an embodiment of a radiator 51 whose particularity lies in the fact that a small wall for locating the passage of diodes and now bearing the reference 75 is situated at the bottom edge of the radiator. The positive diodes 66 are fitted in the small wall 75, the tails of the diodes extending upwards. The negative diodes 69 are fitted in the rear bearing 68, with their tails also oriented upwards. As shown in FIGS. 7A and 7B, the locations of the positive and negative diodes of each pair are offset radially and circumferentially. The connector 70 is distinguished by the simplicity of the connection of the diodes indicated at 76.

FIGS. 8A to 8C show a variant embodiment of the one depicted in FIGS. 7A to 7C which has the particularity that the negative diodes are fitted on a dissipater 67 which is pressed against the rear bearing 68. The connector 70 has the same simple configuration as in FIGS. 7A to 7C.

Figure 9:
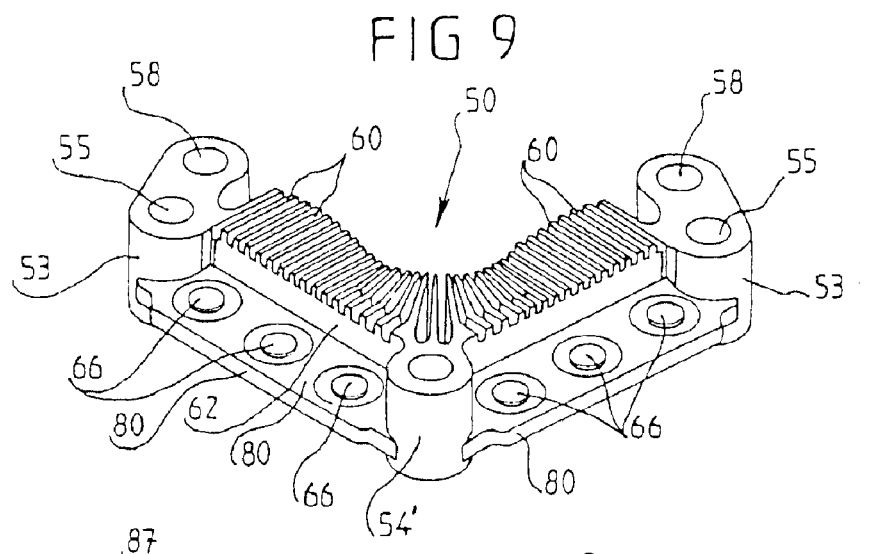
FIG. 9 is a perspective view of an embodiment of the positive radiator device of the rectifying arrangement according to the invention, produced in the form of a single moulded piece.
Figure 10:
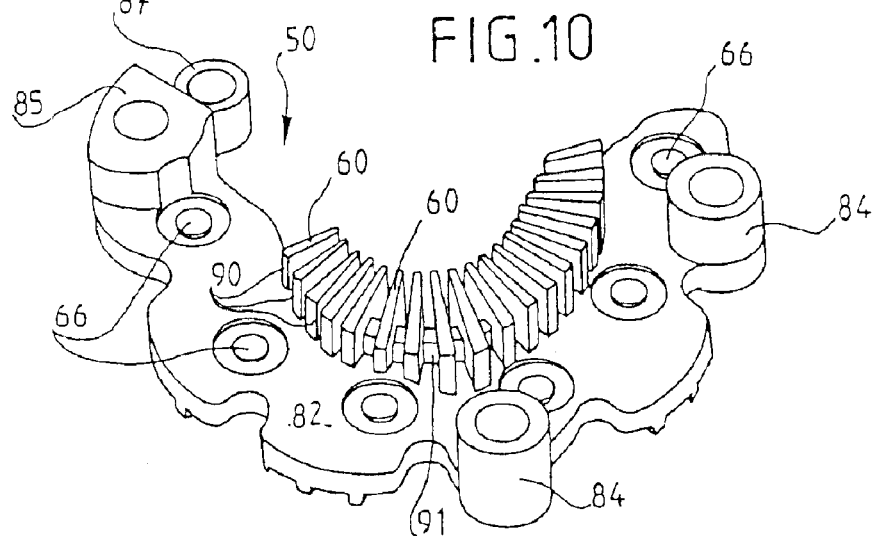
FIG. 10 is yet another embodiment of the positive radiator device of a rectifying arrangement according to the invention, produced in the form of another single moulded piece.

FIGS. 9 and 10 illustrate two versions of an embodiment of a design in which the radiating device, instead of being obtained by assembling two radiators, is produced in the form of a single moulded piece.

In the version of an embodiment according to FIG. 9, the radiating device has a V configuration with three fixings as in the case in FIG. 4. The fixing lugs situated at the ends of the V correspond to the lugs 53 of FIGS. 3 and 4 and therefore bear the same reference. The central fixing at the apex of the V, which now extends over the entire height of the radiating device, is indicated by the reference 54'. As in the embodiment according to FIGS. 3 and 4 the fixing lugs are offset towards the rear with respect to the rear front face designated, as before, by the reference 62. Between the external 53 and central 54' fixing lugs there extends, on each arm of the V, a small wall 80 which projects from the rear face 62 and serves as a support for the location of the positive diodes 66 which then extend parallel to the negative diodes.

Concerning the embodiment of the fine cooling fins bearing, as before, the reference 60, these have the same arrangement as in FIG. 4 with the advantage however that, in the central area, this arrangement is completely regular, without discontinuity, because of the production of the radiating device in one piece.

The version of an embodiment of the radiating device depicted in FIG. 10 has the particularity that the device has a circular configuration. In this case the body, designated by 82, of the radiating device is produced in the form of a plate having the general shape of a segment in the form of an arc of a circle on which six positive diodes 66 are located. The fixings of the radiating device to the rear bearing of the machine are produced in the form of elements with holes in for the passage of the aforementioned screws or tie rods with electrical insulation. Two of these elements denoted 84 constitute protrusions extending beyond the face where the diodes are located. These elements 84 have a cylindrical shape and are situated at the external periphery of the plate 82 respectively close to one end and the middle, whilst an element 85 constitutes a protrusion covering the other end of the plate. The element 85 serves for the location of the B$^+$ terminal of the output of the rectifying arrangement and extends beyond the face where the diodes are located; the said terminals being intended to be connected to the positive terminal of the battery of the vehicle. At this end formed by the element 85, a protrusion 87 which also serves as a fixing element is associated with the end face of the segment in the form of an arc of a circle which constitutes the plate 82.

From the radially internal face of the positive radiator plate 82 there extend radial cooling fins 60 which are extended at 90 over part of the top and bottom faces of the radiating plate 82 in the direction of the diodes. A protrusion 91 can also be seen on the radially internal edge of the plate 82 between each pair of fins 60 in front of five or six positive diodes 66. It can be seen that a diode 66 is disposed close to the end of the plate opposite to the one which is provided with the lug 87 and that a fixing element 84 is disposed between this diode and the following diode, whilst the second fixing element 84 is disposed at the central peripheral part of the plate between the third diode and the fourth diode. It can also be seen that the fin parts 90 on the top face of the plate extend as far as the level of the second, third and fourth diodes as far as an area close to these. As for the sixth diode, this is located just to one side of the fixing protrusion 85 for the B$^+$ terminals. It should also be noted that the external edge of the radiator plate 82 is corrugated, with an area of maximum width at each diode.

Figure 11A:
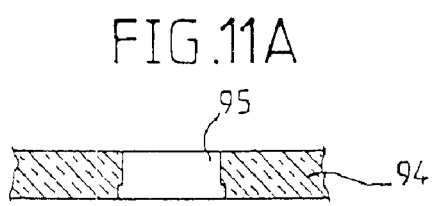
FIGS. 11A and 11B illustrate the location of the diodes by fitting-in in a moulded radiator according to the invention.
Figure 11B:
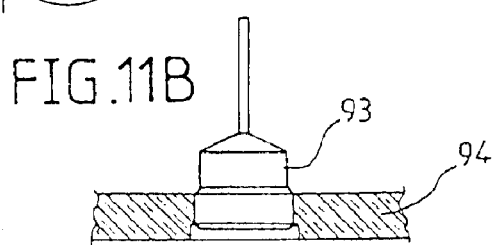

Concerning FIGS. 11 and 12, FIGS. 11A and 11B illustrate the location by fitting-in of a diode indicated at 93 in a support 94 which can be a small wall of a plate. FIG. 11A shows that the support is provided with a reception bore 95 in which the diode will then be fitted in, as shown in FIG. 11B, the body of the diode advantageously being knurled.

Figure 12A:
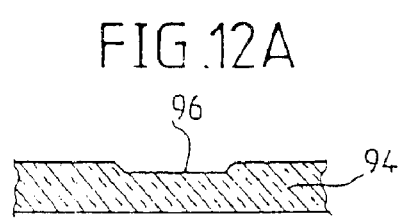
FIGS. 12A and 12B illustrate the location of the diodes by brazing on a radiator of a rectifying arrangement according to the invention.
Figure 12B:
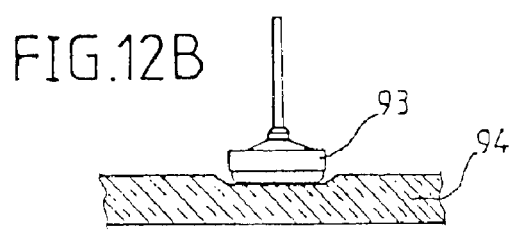

FIG. 12A shows a cup 96 for receiving a diode which is produced in the support 94 and in which a diode 93 will then be located by brazing, in accordance with FIG. 12B.

Figure 13:
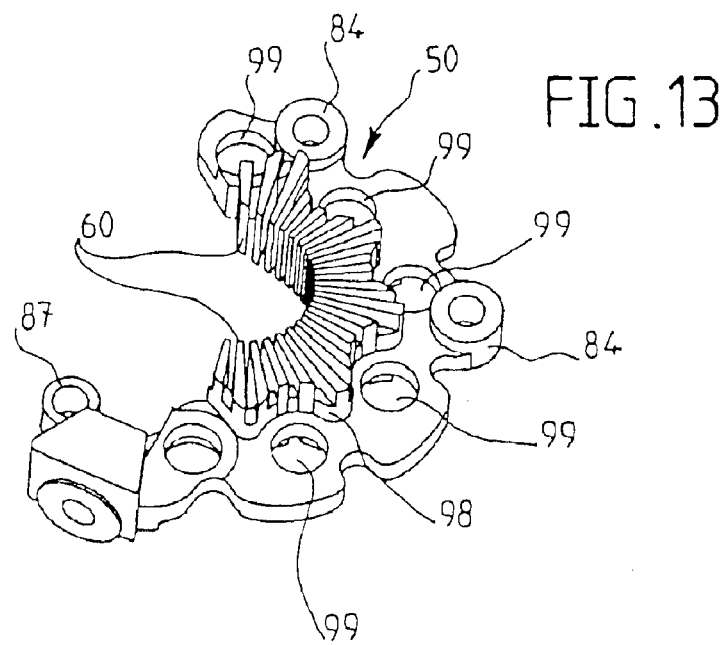
FIG. 13 is a perspective view of yet another embodiment of the positive radiator device of a rectifying arrangement according to the invention.

FIG. 13 illustrates a version of an embodiment of the radiating device according to the invention, which resembles the radiator according to FIG. 10 and is distinguished from that by the fact that the protrusions 91 are produced in the form of a small wall 98 which extends along the radially internal edge of the radiator, the edge and the wall having a corrugated appearance as close as possible to the bores 99 for receiving the positive diodes. The fins 60 extend from the rear edge of the small wall. The small wall 98 and thus the fins 60 extend into the area between two adjacent location bores 99, which increases the thermal efficiency of the bridge rectifier.

Figure 14:
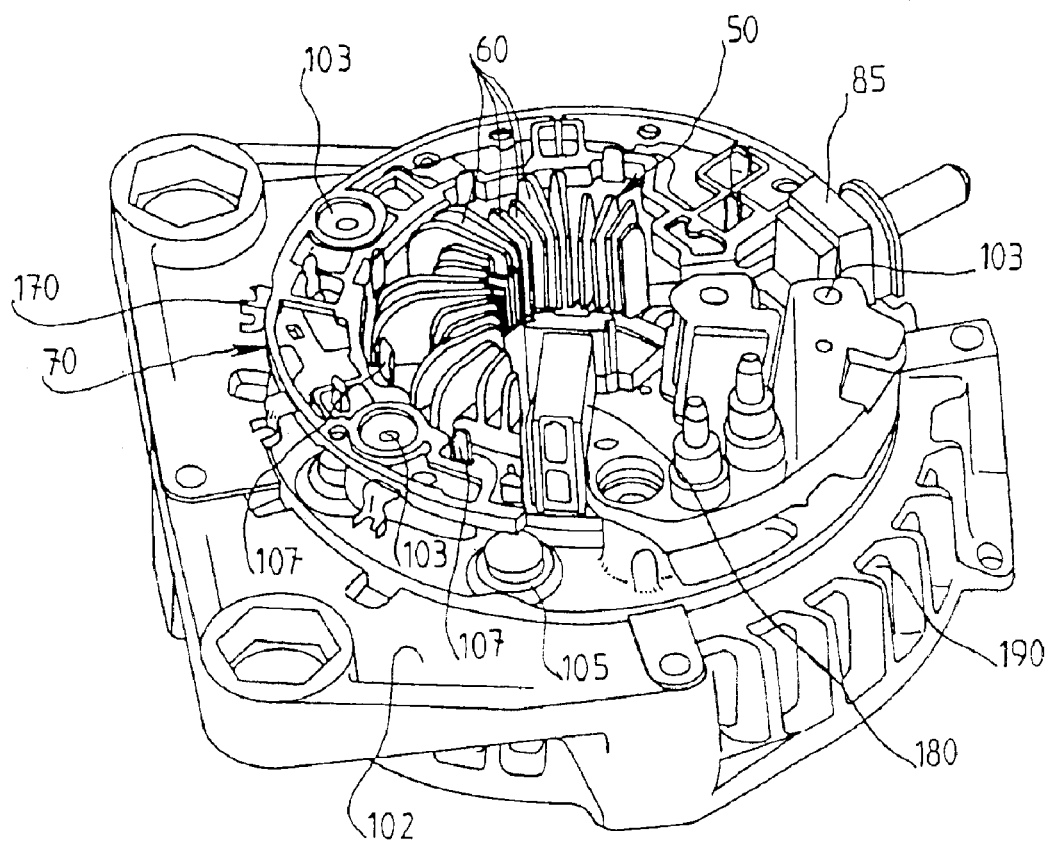
FIG. 14 is a perspective view of a bridge of twelve diodes equipped with another version of an embodiment of the positive radiator according to FIG. 13.

FIG. 14 shows a bridge with twelve diodes overall, in whose design the advantageous characteristics of the invention, stated above, are taken into account. It can be seen that the positive radiator indicated at 50 is fixed to the rear bearing 102 perforated at three points 103. The negative diodes are fitted-in on the rear bearing directly or in variants in small columns 105 issuing from the support. The positive radiator is optimised by an arrangement and configuration of the radial fins 60, which are adapted to the angular distribution of the positive diodes, only the tails of which are indicated at 107 in FIG. 14. It can be seen that two fins 60, which are shorter, extend as far as a point in front of a positive diode and that two fins 60 extend deep in the area situated between two diodes. Thus each diode is framed by fins, at the front and on the two sides. It should also be noted that the positive and negative diodes are connected as illustrated in FIGS. 7 and 8.

As is clear from the description which has just been given of several embodiments of the invention, the positive radiator device proposed by the invention, particularly adapted for a twelve-diode bridge, is produced by moulding, which has the advantage of being able to confer on it a required shape or configuration with a large number of fine cooling fins procuring a large heat exchange surface area and providing optimum cooling of the diodes. The radiator device thus produced can advantageously be used for three-phase alternators with two windings in parallel with six outputs and for six-phase alternators with six outputs.

The positive radiator device, because of its production by moulding, provides cooling by convection by virtue of the installation of a maximum number of fins, whilst affording a reduction in overall size. In addition, the negative diodes on the rear bearing can be separated further than at present, because of the reduction in the number of fixing points from four to three and the elimination of the connecting bar for the two separate positive radiators used up until now. In addition the invention permits a simplification of the tongues connecting the diodes.

In FIG. 14 the top part of the connector 70 has been cut away in order to show the electrically conductive tracks which it has, the said tracks being embedded in the electrically insulating material of the connector, except at some points, for example at the fixing lugs 170 for the phase outputs of the stator and the connecting tongues of the same type as the lugs 76, with the tails 107 of the positive diodes. For more information on the outputs of the phases of the stator which the alternator has reference can be made for example to the document FR 01 04 770 filed on 5 Apr. 2001. For the record it should be stated that the rear bearing forms with the front bearing a casing inside which the body of the alternator stator is fixed, which is secured to a shaft mounted for rotation on the front and rear bearings by means of ball bearings.

The shaft of the rotor has at its rear end collector rings connected to the ends of the rotor excitation winding. The rings are intended to cooperate with brushes mounted in a brush holder referenced 180 in FIG. 14. A fan is mounted on the shaft of the rotor adjacent to the rear bearing in order to evacuate air and create a circulation of air between the fins, through the adjacent holes of the rear bearing, in order to drive towards the rear leading-out wires on the stator winding. The air emerges again through the side openings of the rear bearing referenced 190.

Naturally a protective cap is provided to cover the rectifying arrangement and is fixed to the rear bearing. This cap, hollow in shape, is perforated at the fins, that is to say at its bottom, in order to let pass the air evacuated by the rear fan.

It should be noted that the connector 70 has a shape with an annular cross-section and that it extends above the positive diodes. Its internal periphery is delimited by the external periphery of the fins 70 having at their external periphery a rounded shape. With reference to FIG. 13 it should be noted that the positive radiator has at its external periphery scallops for the tails of the negative diodes to pass. The same applies to FIG. 14. The connector 70 therefore has an annular shape and covers the plate of the positive radiator, which is metallic. In a variant the negative diodes are fixed directly to the rear bearing. Advantageously the aforementioned cap is provided with openings level with the negative diodes for the ventilation of the latter. The openings are produced in the axially oriented annular edge of the cap. The bottom of the cap is provided with openings opposite the fins.

It should be noted that, in FIGS. 5A to 8A, the part of the connector 70 made from electrically insulating material has been shown diagrammatically by a rectangle. In FIG. 14 it should also be noted that a voltage regulator is provided close to the brush holder 180.

Advantageously the protective cap is also provided with openings produced in its cylindrical skirt at the support for the negative diodes so that the support for the negative diodes is cooled by convection and conduction. This is particularly advantageous for the embodiment in FIGS. 5 to 10; the radiator 51 being cooled by the air passing through the bottom of the cap.

What is claimed is:

1. Current-rectifying arrangement for rotary electrical machines of the type comprising:

a first support for a plurality of positive diodes, having the general form of an elongate-shaped plate, a second support for a plurality of negative diodes, in the form of a plate forming part of the rear bearing of the machine, a diode connector and a device for cooling by creating a forced flow of a cooling fluid, such as air, in the axial direction of the machine, through the rectifying arrangement, the first and second supports for the positive and negative diodes and the connector being superimposed in the direction of the axis of the machine and the first support for the positive diodes forming a positive radiator carrying on its front face oriented towards the axis of the machine cooling fins which extend in the axial flow, in the radial direction of the machine, wherein the positive radiator device is produced in the form of at least one molded piece (50, 51, 51'), whose face oriented towards the axis carries a large number of fine cooling fins (60) procuring a large heat exchange surface area, a positive diode support device which comprises two diode support plates, aligned in the peripheral direction about the axis of the machine, wherein the support device is fixed to the rear bearing (68) by three fixings (3, 54, 54', 84, 85), including one in the joining area (54, 54', 84) of the two parts (51), and wherein the two support plates (51, 51') each have at their adjacent ends a fixing lug (54) through which a passage hole (55) for a fixing member passes and wherein, in the assembled state, the two fixing lugs (54) are superimposed so that their passage hole (55) is axially aligned.

2. Arrangement according to claim 1, in which the two positive diode support plates are each formed by a separate support plate and which are disposed in a V configuration and fixed at each of their ends to the rear bearing, wherein the adjacent fixings (54) of the two plates are common.

3. Arrangement according to claim 1, wherein each fixing lug (54) has a reduced height compared with the height of the support plate and advantageously has a height of half the height of the plate.

4. Current-rectifying arrangement for rotary electrical machines of the type comprising a support for a plurality of positive diodes, having the general form of an elongate-shaped plate, a support for a plurality of negative diodes, in the form of a plate forming part of the rear bearing of the machine, a diode connector and a device for cooling by creating a forced flow of a cooling fluid, such as air, in the axial direction of the machine, through the rectifying arrangement, the supports for the positive and negative diodes and the connector being superimposed in the direction of the axis of the machine and the support for the positive diodes forming a positive radiator carrying on its front face oriented towards the axis of the machine cooling fins which extend in the axial flow, in the radial direction of the machine, wherein the positive radiator device is produced in the form of at least one molded piece (50, 51, 51'), whose face oriented towards the axis carries a large number of fine cooling fins (60) procuring a large heat exchange surface area, a positive diode support device which comprises two diode support plates, aligned in the peripheral direction about the axis of the machine, wherein the support device is fixed to the rear bearing (68) by three fixings (3, 54, 54', 84, 85), including one in the joining area (54, 54', 84) of the two plates (51), and wherein the orientation of the cooling fins (60) towards the axis of the machine is chosen so that they extend substantially radially in the middle area of the device formed by the two support plates.

5. Arrangement according to claim 4, wherein the radial length of the fins (60) varies over the length of the parts for the supports for the positive diodes (66), so that their front edge, in the middle area of the device formed by the two plates, is situated on an arc of a circle coaxial with the axis of the machine.

6. Arrangement according to claim 4, wherein the cooling fins (60) are distributed in the area of the middle of the positive diode support device (50) in a substantially regular fashion.

7. Current-rectifying arrangement for rotary electrical machines of the type comprising a support for a plurality of positive diodes, having the general form of an elongate-shaped plate, a support for a plurality of negative diodes, in the form of a plate forming part of the rear bearing of the machine, a diode connector and a device for cooling by creating a forced flow of a cooling fluid, such as air, in the axial direction of the machine, through the rectifying arrangement, the supports for the positive and negative diodes and the connector being superimposed in the direction of the axis of the machine and the support for the positive diodes forming a positive radiator carrying on its front face oriented towards the axis of the machine cooling fins which extend in the axial flow, in the radial direction of the machine, wherein the positive radiator device is produced in the form of at least one molded piece (50, 51, 51'), whose face oriented towards the axis carries a large number of fine cooling fins (60) procuring a large heat exchange surface area, wherein the positive diodes (66) are located on the rear face (62), parallel to the axis of the machine, of the positive diode support device (50, 51).

8. Current-rectifying arrangement for rotary electrical machines of the type comprising a support for a plurality of positive diodes, having the general form of an elongate-shaped plate, a support for a plurality of negative diodes, in the form of plate forming part of the rear bearing of the machine, a diode connector and a device for cooling by creating a forced flow of a cooling fluid, such as air, in the axial direction of the machine, through the rectifying arrangement, the supports for the positive and negative diodes and the connector being superimposed in the direction of the axis of the machine and the support for the positive diodes forming a positive radiator carrying on its front face oriented towards the axis of the machine cooling fins which extend in the axial flow, in the radial direction of the machine, wherein the positive radiator device is produced in the form of at least one molded piece (50, 51, 51'), whose face oriented towards the axis carries a large number of fine cooling fins (60) procuring a large heat exchange surface area, wherein each positive diode support part (66) carries on its rear face (62) parallel to the axis of the machine a small wall (65, 73, 75, 80) which projects perpendicularly from the rear face (62) and serves as a support for locating the positive diodes (66), and wherein the positive diodes (66) and the negative diodes (69) which are located in a support (67) forming part of the rear bearing (68) are mounted in opposite orientations or parallel.

* * * * *